US012647853B2

(12) United States Patent (10) Patent No.: US 12,647,853 B2
Paz et al. (45) Date of Patent: Jun. 2, 2026

(54) SYNCHRONIZATION AND BEAM MANAGEMENT SESSIONS FOR LONG-LASTING DATA OFFLOADING SESSIONS OVER SUB-TERAHERTZ LINKS

(71) Applicant: QUALCOMM Incorporated, San Diego, CA (US)

(72) Inventors: Daniel Paz, Geva Carmel (IL); Michael Levitsky, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 622 days.

(21) Appl. No.: 18/151,952

(22) Filed: Jan. 9, 2023

(65) Prior Publication Data

US 2024/0236780 A1 Jul. 11, 2024

(51) Int. Cl.
*H04W 36/22* (2009.01)
*H04W 36/00* (2009.01)

(52) U.S. Cl.
CPC ....... *H04W 36/0072* (2013.01); *H04W 36/22* (2013.01)

(58) Field of Classification Search
CPC ............. H04W 36/0072; H04W 36/22; H04W 56/0015; H04W 28/0865
USPC ......................................... 370/331
See application file for complete search history.

(56) References Cited

U.S. PATENT DOCUMENTS

2012/0307744 A1 12/2012 Charbit et al.
2018/0020330 A1* 1/2018 Li ....................... H04L 27/2685

500 ➙

2023/0093950 A1* 3/2023 Demir .................. H04L 27/266
                                                      370/503
2023/0354282 A1 11/2023 Kim et al.
2023/0413354 A1* 12/2023 Zaev ..................... H04W 72/53
2024/0163037 A1* 5/2024 Chukka ................. H04L 5/0042

FOREIGN PATENT DOCUMENTS

WO        2022065549 A1    3/2022

OTHER PUBLICATIONS

International Search Report and Written Opinion—PCT/US2024/010562—ISA/EPO—May 16, 2024.

* cited by examiner

*Primary Examiner* — Ricky Q Ngo
*Assistant Examiner* — Meheret Woldegebreal Kidane
(74) *Attorney, Agent, or Firm* — Harrity & Harrity, LLP

(57) ABSTRACT

Various aspects of the present disclosure generally relate to wireless communication. In some aspects, a network node may establish a sub-terahertz (sub-THz) link with a sub-THz node, wherein the sub-THz link is associated with a secondary cell (SCell) of the network node, and the sub-THz link is associated with a long-lasting data offloading session. The network node may schedule an additional synchronization and beam management session between the network node and the sub-THz node. The network node may perform synchronization and beam management during the additional synchronization and beam management session to achieve a time synchronization between the network node and the sub-THz node and to refine an SCell transmit (Tx) beam and an SCell receive (Rx) beam for the sub-THz link. Numerous other aspects are described.

30 Claims, 10 Drawing Sheets

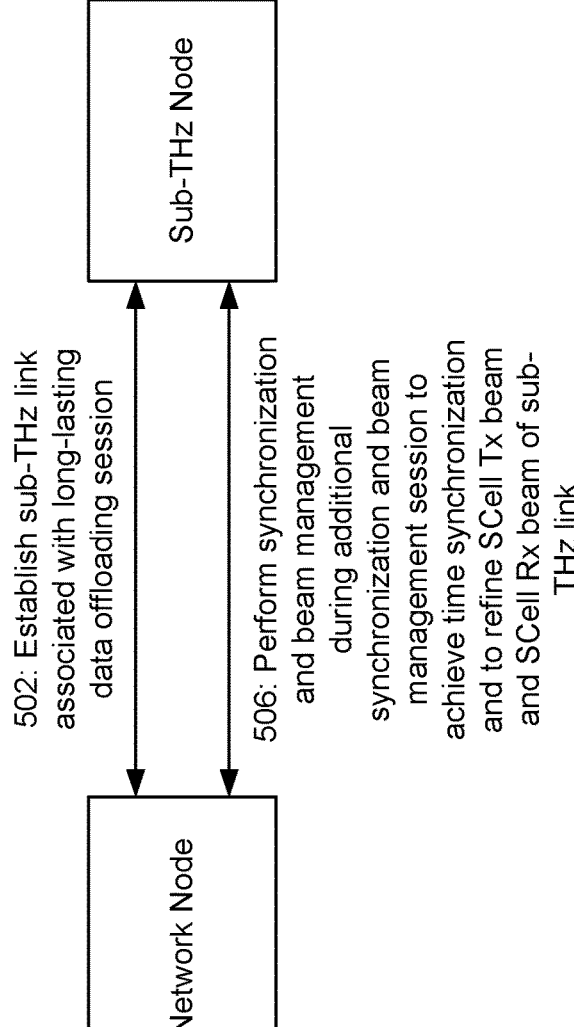

502: Establish sub-THz link associated with long-lasting data offloading session 504: Schedule additional synchronization and beam management session based at least in part on time-based scheduling or event-based scheduling 506: Perform synchronization and beam management during additional synchronization and beam management session to achieve time synchronization and to refine SCell Tx beam and SCell Rx beam of sub-THz link Sub-THz Node Network Node

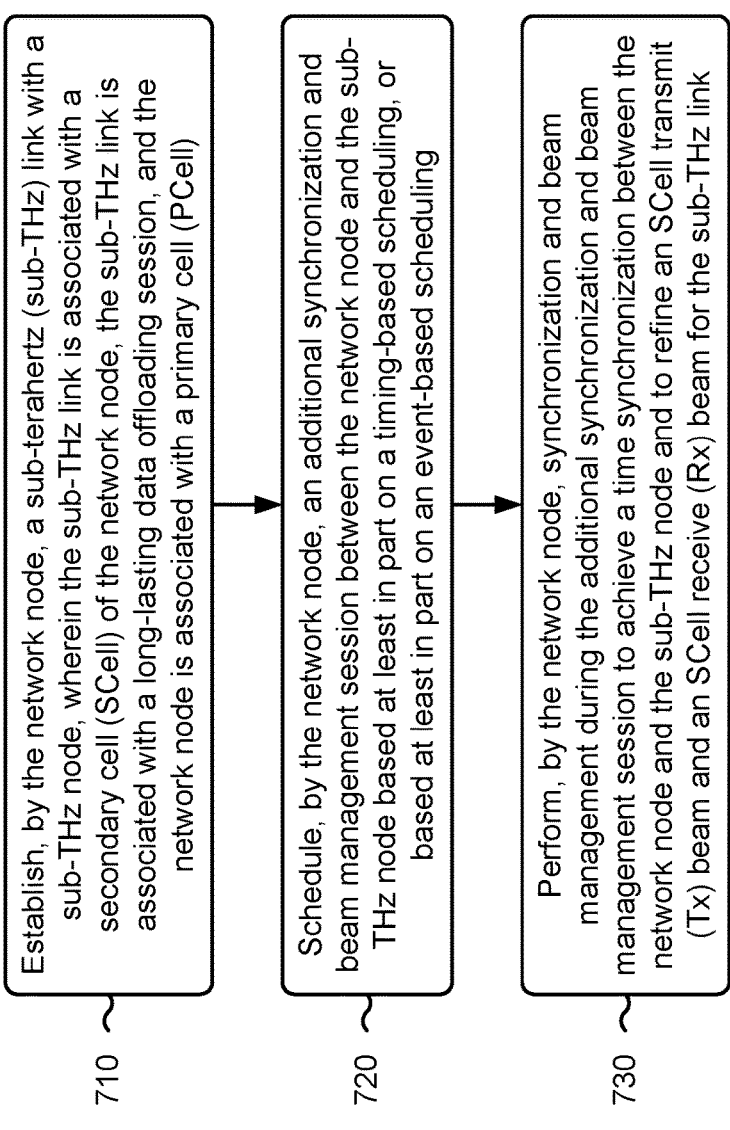

710 ~ Establish, by the network node, a sub-terahertz (sub-THz) link with a sub-THz node, wherein the sub-THz link is associated with a secondary cell (SCell) of the network node, the sub-THz link is associated with a long-lasting data offloading session, and the network node is associated with a primary cell (PCell)

720 ~ Schedule, by the network node, an additional synchronization and beam management session between the network node and the sub-THz node based at least in part on a timing-based scheduling, or based at least in part on an event-based scheduling 730 ~ Perform, by the network node, synchronization and beam management during the additional synchronization and beam management session to achieve a time synchronization between the network node and the sub-THz node and to refine an SCell transmit (Tx) beam and an SCell receive (Rx) beam for the sub-THz link

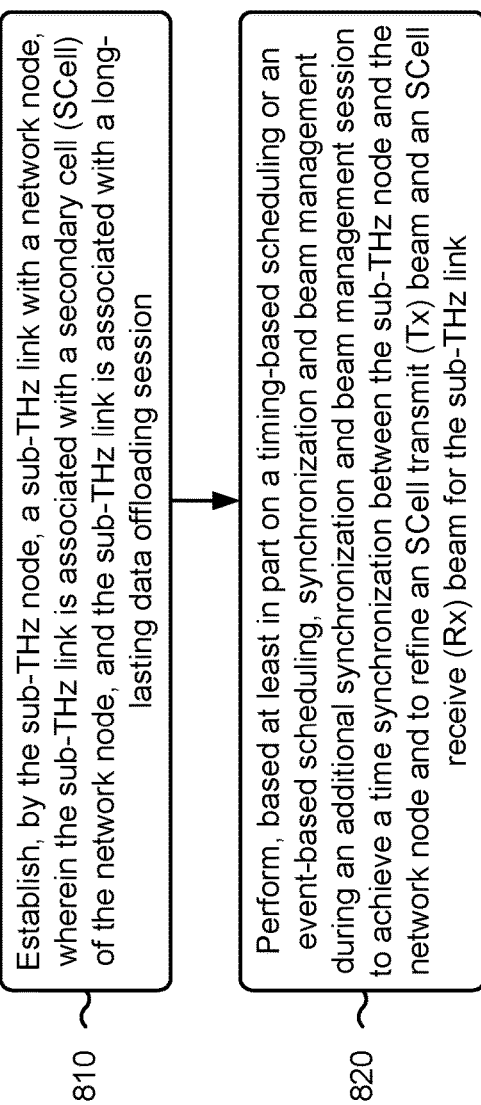

800

810 Establish, by the sub-THz node, a sub-THz link with a network node, wherein the sub-THz link is associated with a secondary cell (SCell) of the network node, and the sub-THz link is associated with a long-lasting data offloading session 820 Perform, based at least in part on a timing-based scheduling or an event-based scheduling, synchronization and beam management during an additional synchronization and beam management session to achieve a time synchronization between the sub-THz node and the network node and to refine an SCell transmit (Tx) beam and an SCell receive (Rx) beam for the sub-THz link

FIG. 8

SYNCHRONIZATION AND BEAM MANAGEMENT SESSIONS FOR LONG-LASTING DATA OFFLOADING SESSIONS OVER SUB-TERAHERTZ LINKS

FIELD OF THE DISCLOSURE

Aspects of the present disclosure generally relate to wireless communication and to techniques and apparatuses for synchronization and beam management sessions for long-lasting data offloading sessions over sub-terahertz (sub-THz) links.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a network node includes a memory and one or more processors, coupled to the memory, that, based at least in part on information stored in the memory, are configured to: establish a sub-terahertz (sub-THz) link with a sub-THz node, wherein the sub-THz link is associated with a secondary cell (SCell) of the network node, the sub-THz link is associated with a long-lasting data offloading session, and the network node is associated with a primary cell (PCell); schedule an additional synchronization and beam management session between the network node and the sub-THz node based at least in part on a timing-based scheduling, or based at least in part on an event-based scheduling; and perform synchronization and beam management during the additional synchronization and beam management session to achieve a time synchronization between the network node and the sub-THz node and to refine an SCell transmit (Tx) beam and an SCell receive (Rx) beam for the sub-THz link.

In some implementations, an apparatus for wireless communication at a sub-THz node includes a memory and one or more processors, coupled to the memory, that, based at least in part on information stored in the memory, are configured to: establish a sub-THz link with a network node, wherein the sub-THz link is associated with an SCell of the network node, and the sub-THz link is associated with a long-lasting data offloading session; and perform, based at least in part on a timing-based scheduling or an event-based scheduling, synchronization and beam management during an additional synchronization and beam management session to achieve a time synchronization between the sub-THz node and the network node and to refine an SCell Tx beam and an SCell Rx beam for the sub-THz link.

In some implementations, a method of wireless communication performed by a network node includes establishing, by the network node, a sub-THz link with a sub-THz node, wherein the sub-THz link is associated with an SCell of the network node, the sub-THz link is associated with a long-lasting data offloading session, and the network node is associated with a PCell; scheduling, by the network node, an additional synchronization and beam management session between the network node and the sub-THz node based at least in part on a timing-based scheduling, or based at least in part on an event-based scheduling; and performing, by the network node, synchronization and beam management during the additional synchronization and beam management session to achieve a time synchronization between the network node and the sub-THz node and to refine an SCell Tx beam and an SCell Rx beam for the sub-THz link.

In some implementations, a method of wireless communication performed by a sub-THz node includes establishing, by the sub-THz node, a sub-THz link with a network node, wherein the sub-THz link is associated with an SCell of the network node, and the sub-THz link is associated with a long-lasting data offloading session; and performing, based at least in part on a timing-based scheduling or an event-based scheduling, synchronization and beam management during an additional synchronization and beam management session to achieve a time synchronization between the sub-THz node and the network node and to refine an SCell Tx beam and an SCell Rx beam for the sub-THz link.

In some implementations, a non-transitory computer-readable medium storing a set of instructions for wireless communication includes one or more instructions that, when executed by one or more processors of a network node, cause the network node to: establish a sub-THz link with a sub-THz node, wherein the sub-THz link is associated with an SCell of the network node, the sub-THz link is associated with a long-lasting data offloading session, and the network node is associated with a PCell; schedule an additional synchronization and beam management session between the network node and the sub-THz node based at least in part on a timing-based scheduling, or based at least in part on an event-based scheduling; and perform synchronization and beam management during the additional synchronization and beam management session to achieve a time synchronization between the network node and the sub-THz node and to refine an SCell Tx beam and an SCell Rx beam for the sub-THz link.

In some implementations, a non-transitory computer-readable medium storing a set of instructions for wireless communication includes one or more instructions that, when executed by one or more processors of a sub-THz node, cause the sub-THz node to: establish a sub-THz link with a network node, wherein the sub-THz link is associated with an SCell of the network node, and the sub-THz link is associated with a long-lasting data offloading session; and perform, based at least in part on a timing-based scheduling or an event-based scheduling, synchronization and beam management during an additional synchronization and beam management session to achieve a time synchronization between the sub-THz node and the network node and to refine an SCell Tx beam and an SCell Rx beam for the sub-THz link.

In some implementations, an apparatus for wireless communication includes means for establishing a sub-THz link with a sub-THz node, wherein the sub-THz link is associated with an SCell of the apparatus, the sub-THz link is associated with a long-lasting data offloading session, and the apparatus is associated with a PCell; means for scheduling an additional synchronization and beam management session between the apparatus and the sub-THz node based at least in part on a timing-based scheduling, or based at least in part on an event-based scheduling; and means for performing synchronization and beam management during the additional synchronization and beam management session to achieve a time synchronization between the apparatus and the sub-THz node and to refine an SCell Tx beam and an SCell Rx beam for the sub-THz link.

In some implementations, an apparatus for wireless communication includes means for establishing a sub-THz link with a network node, wherein the sub-THz link is associated with an SCell of the network node, and the sub-THz link is associated with a long-lasting data offloading session; and means for performing, based at least in part on a timing-based scheduling or an event-based scheduling, synchronization and beam management during an additional synchronization and beam management session to achieve a time synchronization between the apparatus and the network node and to refine an SCell Tx beam and an SCell Rx beam for the sub-THz link.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5-6 are diagrams illustrating examples associated with synchronization and beam management sessions for long-lasting data offloading sessions over sub-THz links, in accordance with the present disclosure.

FIGS. 7-8 are diagrams illustrating example processes associated with synchronization and beam management sessions for long-lasting data offloading sessions over sub-THz links, in accordance with the present disclosure.

DETAILED DESCRIPTION

Various aspects of the disclosure are described more fully hereinafter with reference to the accompanying drawings. This disclosure may however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
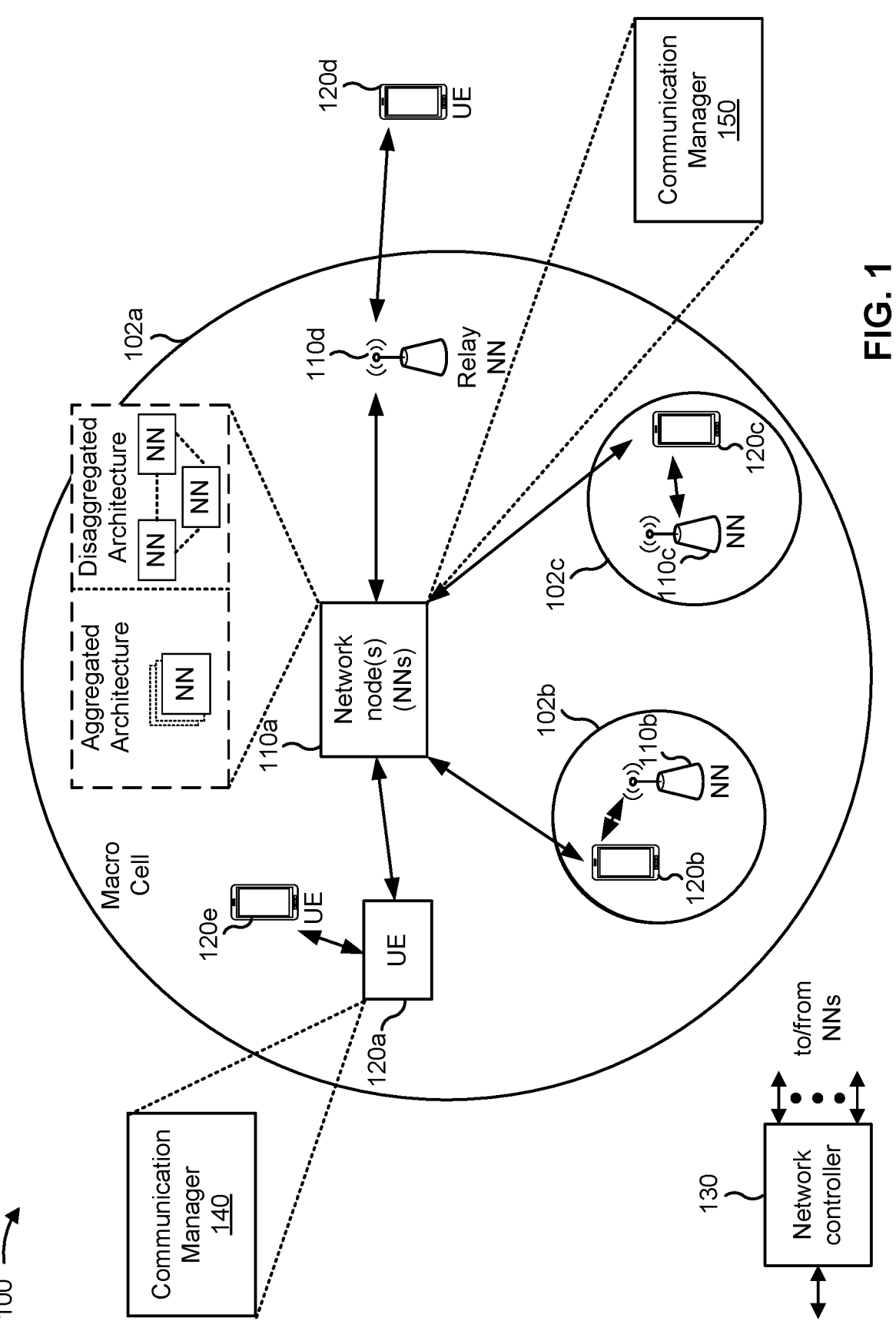
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB)

node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a network node (e.g., network node 110) may include a communication manager 150. As described in more detail elsewhere herein, the communication manager 150 may establish a sub-terahertz (sub-THz) link with a sub-THz node, wherein the sub-THz link is associated with a secondary cell (SCell) of the network node, the sub-THz link is associated with a long-lasting data offloading session, and the network node is associated with a primary cell (PCell); schedule an additional synchronization and beam management session between the network node and the sub-THz node based at least in part on a timing-based scheduling, or based at least in part on an event-based scheduling; and perform synchronization and beam management during the additional synchronization and beam management session to achieve a time synchronization between the network node and the sub-THz node and to refine an SCell transmit (Tx) beam and an SCell receive (Rx) beam for the sub-THz link. Additionally, or alternatively, the communication manager 150 may perform one or more other operations described herein.

In some aspects, a sub-THz node (e.g., UE 120) may include a communication manager 140. As described in more detail elsewhere herein, the communication manager 140 may establish a sub-THz link with a network node, wherein the sub-THz link is associated with an SCell of the network node, and the sub-THz link is associated with a long-lasting data offloading session; and perform, based at least in part on a timing-based scheduling or an event-based scheduling, synchronization and beam management during an additional synchronization and beam management session to achieve a time synchronization between the sub-THz node and the network node and to refine an SCell Tx beam and an SCell Rx beam for the sub-THz link. Additionally, or alternatively, the communication manager 140 may perform one or more other operations described herein.

As indicated above, FIG. 1 is provided as an example. Other examples may differ from what is described with regard to FIG. 1.

Figure 2:
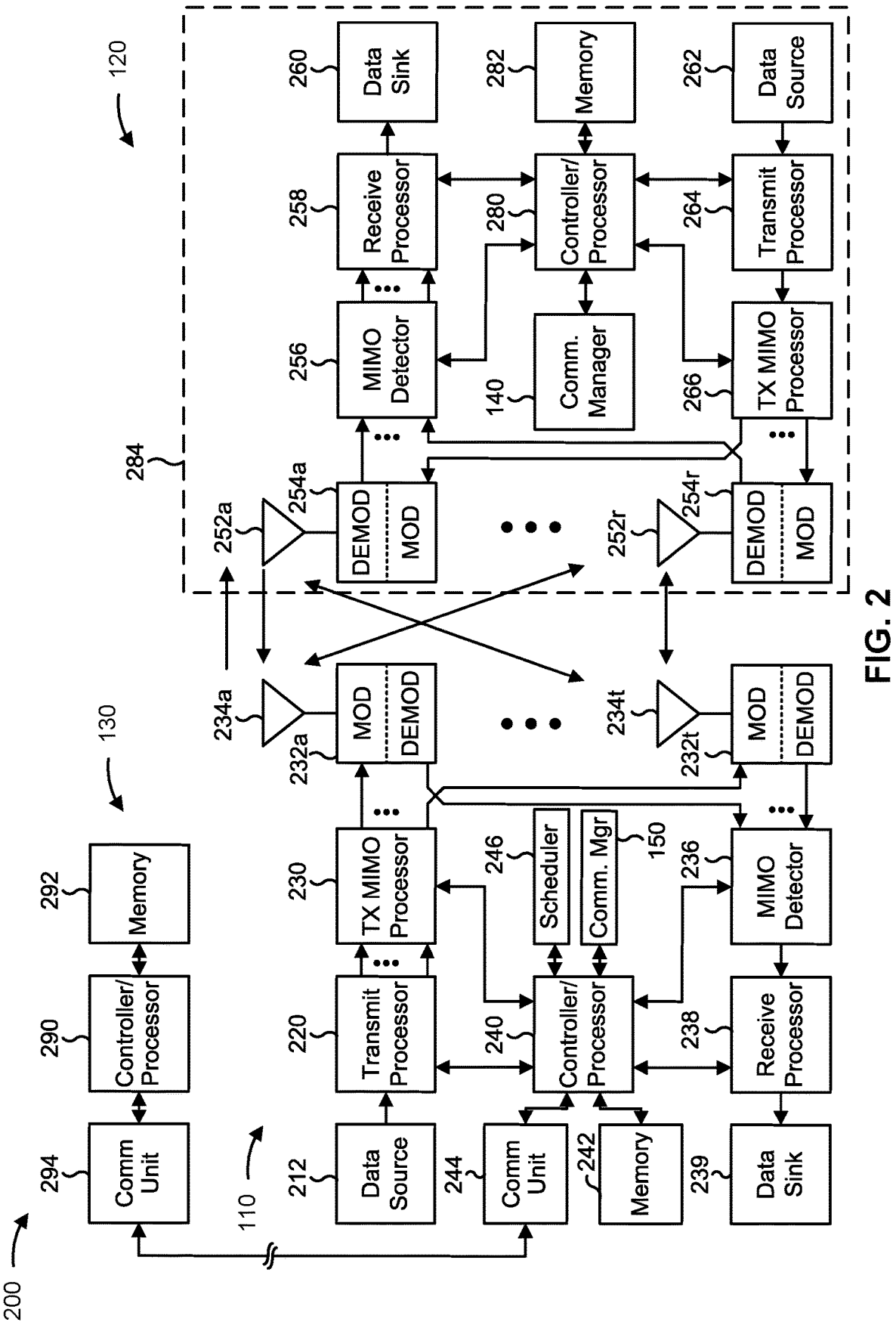
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A Tx multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a Tx MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the Tx MIMO processor 266. The transceiver may be used by a processor (e.g., the controller/processor 280) and the memory 282 to perform aspects of any of the methods described herein (e.g., with reference to FIGS. 5-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the Tx MIMO processor 230. The transceiver may be used by a processor (e.g., the controller/processor 240) and the memory 242 to perform aspects of any of the methods described herein (e.g., with reference to FIGS. 5-10).

The controller/processor 240 of the network node 110, the controller/processor 280 of the UE 120, and/or any other component(s) of FIG. 2 may perform one or more techniques associated with synchronization and beam management sessions for long-lasting data offloading sessions over sub-THz links, as described in more detail elsewhere herein. In some aspects, the sub-THz node described herein is the UE 120, is included in the UE 120, or includes one or more components of the UE 120 shown in FIG. 2. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a network node (e.g., network node 110) includes means for establishing, by the network node, a sub-THz link with a sub-THz node, wherein the sub-THz link is associated with an SCell of the network node, the sub-THz link is associated with a long-lasting data offloading session, and the network node is associated with a PCell; means for scheduling, by the network node, an additional synchronization and beam management session between the network node and the sub-THz node based at least in part on a timing-based scheduling, or based at least in part on an event-based scheduling; and/or means for performing, by the network node, synchronization and beam management during the additional synchronization and beam management session to achieve a time synchronization between the network node and the sub-THz node and to refine an SCell Tx beam and an SCell Rx beam for the sub-THz link. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a sub-THz node (e.g., UE 120) includes means for establishing, by the sub-THz node, a sub-THz link with a network node, wherein the sub-THz link is associated with an SCell of the network node, and the sub-THz link is associated with a long-lasting data offloading session; and/or means for performing, based at least in part on a timing-based scheduling or an event-based scheduling, synchronization and beam management during an additional synchronization and beam management session to achieve a time synchronization between the sub-THz node and the network node and to refine an SCell Tx beam and an SCell Rx beam for the sub-THz link. In some aspects, the means for the sub-THz node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
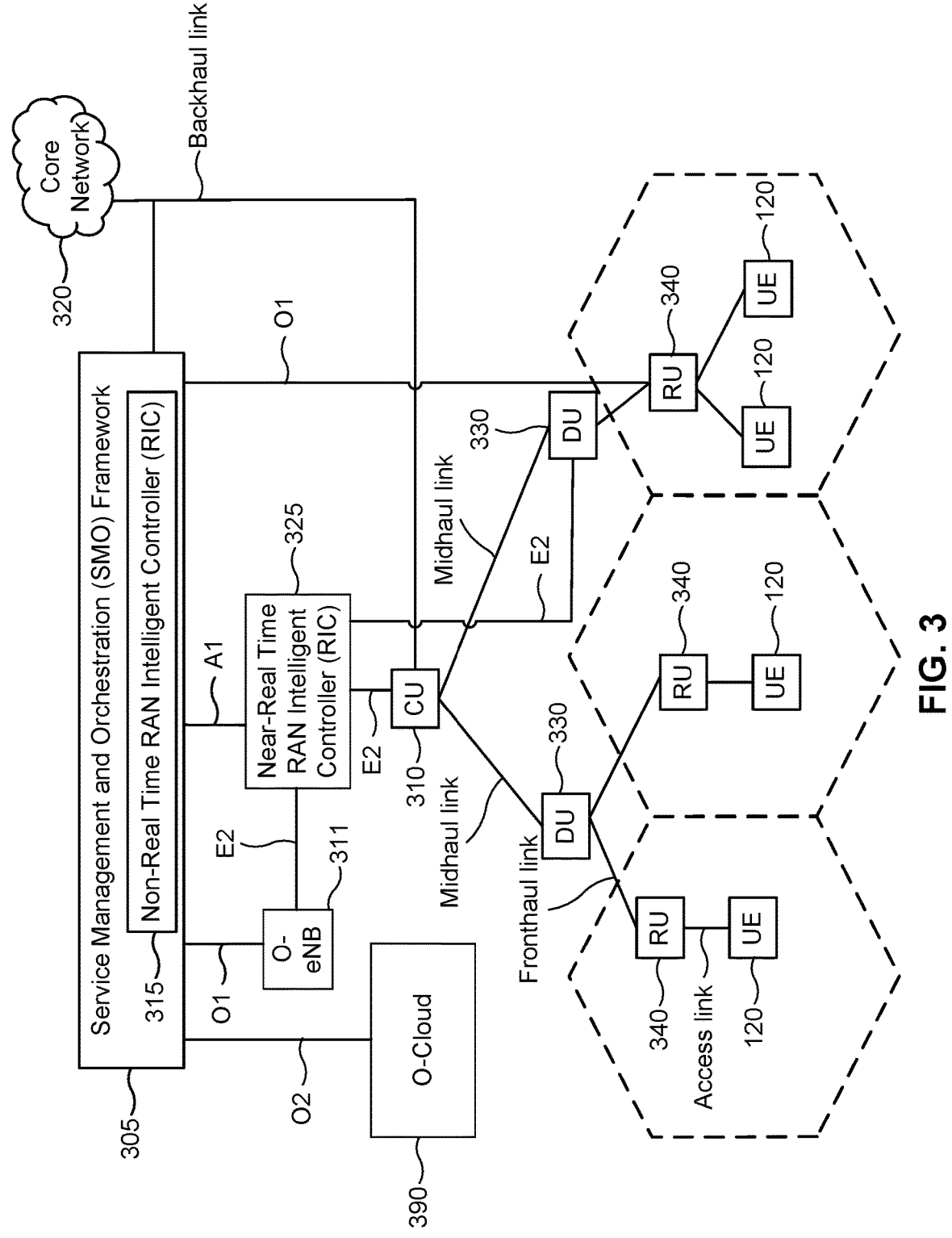
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

A sub-THz band, which may be associated with a frequency spectrum ranging between 90 GHz and 300 GHz, is expected to enable relatively high data rates for wireless communications. However, sub-THz bands have several band characteristics which impose new limitations and challenges related to massive sub-THz deployments.

One challenge associated with massive sub-THz deployments may be more limited maximum power amplifier (PA) output power characteristics, as compared to millimeter wave (mmWave) deployments. For example, in a sub-THz deployment, the maximum PA output power may be approximately 10 dB less, as compared to a mmWave deployment. The more limited maximum PA output power characteristics, which may be coupled to a higher signal bandwidth, may result in an effective isotropic radiated power (EIRP) deficit for a sub-THz link, and a more limited coverage may be achieved as a result (e.g., two to three times lower range than for mmWave bands).

Another challenge associated with massive sub-THz deployments may be a reduction in sub-THz PA efficiency (e.g., a reduction by a factor of two), as compared to mmWave PAs, which may result in poor sub-THz link power/energy efficiency.

Yet another challenge associated with massive sub-THz deployments may be a higher power consumption anticipated for sub-THz Rx and Tx operations, as compared to mmWave Rx and Tx operations, which may be due to higher signal bandwidths (e.g., due to at least an 8 times higher subcarrier spacing (SCS)) and high targeted data rates. The higher power consumption may be based at least in part on a less power efficient RF processing, a higher power consumption related to analog-to-digital/digital-to-analog components having increased sampling rates (which may be linearly translated to the consumed power), higher rate digital processing, high bit rates to be addressed on the decoder side, and/or higher memory/storage (intermediate buffers) related power consumption.

To address the above limitations and challenges related to massive sub-THz deployments, a sub-THz deployment scheme may be defined to achieve a massive and power efficient sub-THz deployment for a variety of potential use cases and scenarios. Since a standalone (SA) or PCell sub-THz deployment may be problematic from a coverage perspective, a massive sub-THz usage may be via non-standalone (NSA) or not-self-contained sub-THz deployments. Sub-THz bands may be targeted for UE data/cell traffic offloading for UEs that consume relatively large amounts of data. Broader coverage may be achieved based at least in part on other frequency bands (e.g., FR1/FR2 bands). Since sub-THz bands may be less efficient than mmWave bands from a power perspective (e.g., lower sub-THz PA efficiency, higher RF on power consumption, and/or increased analog-to-digital/digital-to-analog power consumption), traffic offloading (e.g., gNB to UE, or UE to gNB) may be achieved using sub-THz-based APs, which may be placed in some critical locations with high data volume demand potential. The APs may provide a per-demand, high-capacity channel for sub-THz eligible UEs registered under a lower band or PCell. The channel may be a supplementary high-capacity channel with a burst activity pattern for a sparse usage in time. Small data and control-related signaling and link maintenance procedures may be moved to lower bands to improve efficiency. Since a number of simultaneously active sub-THz UEs is likely to be limited (e.g., due to relatively high power/battery requirements and a relatively high data volume targeted for sub-THz links), a plurality of sub-THz eligible UEs (e.g., all sub-THz eligible UEs) may be subscribed to or connected to a lower band or PCell all of the time, as operating a complete cell for sporadic use may be costly.

The sub-THz deployment scheme may define a power efficient sub-THz deployment, which may implement a spot-based coverage within a PCell range. The sub-THz deployment scheme may be based at least in part on an inter-band carrier aggregation (CA), where a sub-THz band may be associated with an SCell, and a PCell may be based at least in part on a lower frequency band (e.g., FR1, FR2, or FR4). A sub-THz SCell may have a minimum scope of critical functionality. The sub-THz SCell may rely on a PCell or lower frequency band cell as much as possible. The sub-THz SCell may not be associated with "always on" signals. The THz SCell may be activated for sporadic and typically short time sessions, and may be associated with a burst activity pattern. The sub-THz deployment scheme may be associated with low complexity, low power, low latency synchronization and beam management recovery procedures per SCell activation. An SCell synchronization and beam management may be partially based at least in part on the PCell (e.g., the PCell may be associated with a start for a sub-THz link activation).

The sub-THz deployment scheme may be based at least in part on a single hop or multi-hop repeating between a sub-THz UE transceiver and sub-THz gNB transceiver to bridge over sub-THz range limitations. Power efficient smart repeaters, such as repeaters (RPs) and APs, with out-of-band (OOB) control based at least in part on the PCell may be used for sub-THz operations. RPs may be involved in cases in which additional repeaters are needed to get a connectivity between an AP and a network node. APs and RPs may have the same functionality, but may have some hardware and capability differences. APs may be used for direct connections with UEs (service links), whereas RPs may be used for intermediate or direct links with network nodes (donor links). Smart sub-THz repeaters may be associated with a reduced capability UE for PCell connectivity, which may be associated with delivering OOB control, reports, and/or feedback. Smart sub-THz repeaters may be associated with a wideband analog amplify-and-forward function-ality for sub-THz data forwarding. Smart sub-THz repeaters may be associated with a dedicated narrowband (NB) local synchronization signal block (SSB), a synchronization reference signal Tx, and/or an Rx capability over a sub-THz band for complementary time synchronization and beam refinement (e.g., TB processing). The single hop or multi-hop repeating may be associated with progressive synchronization across hops, hop-specific synchronization, and beam management sessions with customized synchronization reference signal or SSB burst scheduling.

Figure 4:
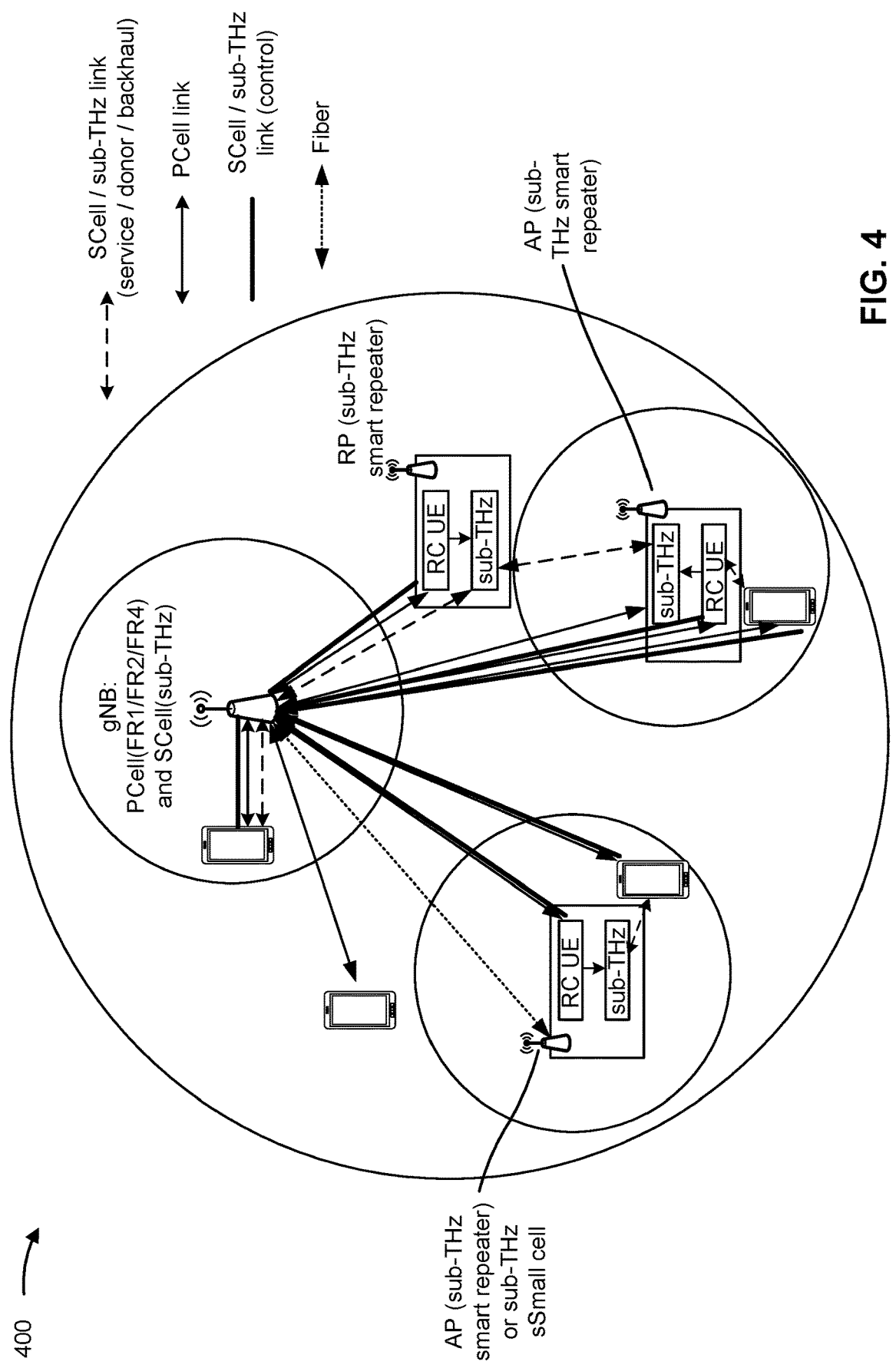
FIG. 4 is a diagram illustrating an example of a sub-terahertz (sub-THz) deployment, in accordance with the present disclosure.

FIG. 4 is a diagram illustrating an example 400 of a sub-THz deployment, in accordance with the present disclosure.

As shown in FIG. 4, a network node (e.g., gNB) may be associated with a PCell and an SCell. The PCell may be associated with an FR1, FR2, or FR4 band. The SCell may be associated with a sub-THz band. A UE may communicate with the network node via a PCell link, an SCell and sub-THz link for service, donor, and/or backhaul, and an SCell and sub-THz link for control. The network node may communicate with a first AP (e.g., a sub-THz smart repeater) or sub-THz small cell via a fiber link. A reduced capability (RC) UE associated with the first AP may communicate with the network node via a PCell link, and/or an SCell and sub-THz link for control. A UE associated with the first AP (e.g., a non-reduced-capability UE) may communicate with the first AP or the sub-THz small cell via an SCell and sub-THz link for service, donor, and/or backhaul. The network node may communicate with a sub-THz smart repeater via an SCell and sub-THz link for service, donor, and/or backhaul. The sub-THz smart repeater may extend a range of a second AP (e.g., a sub-THz smart repeater). A UE may communicate with the second AP via an SCell and sub-THz link for service, donor, and/or backhaul, and the UE may communicate with the network node via a PCell link and an SCell and sub-THz link for control. For UEs, a sub-THz session eligibility criterion may be based at least in part on an in-sub-THz AP or network node coverage range, a mobility that is less than a threshold (e.g., semi-static sub-THz beam and channel), a sub-THz capability, sufficient battery resources, and a significant data volume requirement or potential.

As indicated above, FIG. 4 is provided as an example. Other examples may differ from what is described with regard to FIG. 4.

In a sub-THz deployment, "always on" signals may not be implemented in an SCell, and SCell links may instead be dynamically activated and deactivated for per-demand sessions (e.g., relatively short sessions), during which eligible UEs may be allocated with high-capacity sub-THz links from a network node. Such a scheme may allow a more power efficient and higher range sub-THz deployment. The power efficient sub-THz deployment may be based at least in part in part on inter-band CA and multi-hop links. Dynamic activation and deactivation of sub-THz links will involve synchronization and beam management sessions per sub-THz link activation. Low complexity, low power, and low latency synchronization and bean management sessions may be used for the activation of sub-THz links.

During the synchronization and beam management session, a network node may schedule a dedicated synchronization and beam management reference signal, during which several Tx beams may be swept inside an angular sector/ span around a known coarse Tx beam direction for a sub-THz link/hop, while all of these beams may be tested with several Rx beam hypotheses around a known coarse Rx beam direction. The synchronization and beam management session may be carried out per sub-THz link activation, and may allow achieving a complete time synchronization and serving Tx/Rx beam refinement/determination for a sub-THz link, where a frequency synchronization may be known or derived based at least in part on a PCell. In accordance with a progressive synchronization approach, the synchronization and beam management session may take place per hop (e.g., is hop-specific) and may be allocated progressively across multi-hop links in a downlink direction. The per hop synchronization and beam management session may be based at least in part on a customized per hop synchronization and beam management reference signal scheduled by the network node for transmission from a corresponding hop Tx edge (in the downlink direction) and reception by a corresponding Rx edge of an addressed hop. The synchronization and beam management session may be scheduled in this progressive manner on each involved hop of a multi-hop sub-THz link. After every synchronization and beam management session (per hop), a receiving node of the hop may acquire a complete sub-THz timing synchronization with respect to a Tx node of the hop and may determine a serving sub-THz beam (e.g., a Tx-Rx beam pair) for the hop. The selected Tx beam may be reported by an Rx node to the network node over the PCell to be used for a Tx node beam configuration for data forwarding over the established sub-THz link.

However, some scenarios and use cases may need long-lasting data offloading sessions, and per-demand sessions may be insufficient. For example, such scenarios may involve wireless "fiber to the home" over a sub-THz band, or wireless displays or cameras. Such scenarios may assume fixed multi-hop line-of-sight (LOS) links (e.g., no nomadic UEs, which may have some mobility), so timing deviations and beam deviations may be expected to be more limited but should still be tracked/maintained for improved multi-hop sub-THz link robustness and for avoidance of performance degradation. With such long-lasting data offloading sessions, timing deviations and beam deviations over time may result in performance degradation.

In various aspects of techniques and apparatuses described herein, a network node may establish a sub-THz link with a sub-THz node. The network node may be associated with a PCell and an SCell. The sub-THz link may be associated with the SCell. The sub-THz link may be associated with a long-lasting data offloading session. "Long-lasting" data offloading sessions may be data offloading sessions that are not activated for sporadic and relatively short time sessions in accordance with a burst activity pattern, as are "short-lasting" data offloading sessions, but rather may be established for relatively long periods of time in accordance with a constant activity pattern. "Long-lasting" data offloading sessions may be associated with "always on" signals. "Long-lasting" data offloading sessions may be non-sporadic and may not be associated with bursts of data transmissions. The network node may schedule an additional synchronization and beam management session between the network node and the sub-THz node based at least in part on a timing-based scheduling, or based at least in part on an event-based scheduling. The network node may perform synchronization and beam management during the additional synchronization and beam management session to achieve a time synchronization between the network node and the sub-THz node and to refine an SCell Tx beam and an SCell Rx beam for the sub-THz link.

In some aspects, synchronization and beam management maintenance and tracking for the long-lasting data offloading session over the sub-THz link (e.g., via the SCell) may be defined. The sub-THz link may be activated in accordance with an activation duration. For relatively long-lasting sub-THz based data offloading sessions, sub-THz beam tracking and timing maintenance/tracking may be achieved based at least in part on additional synchronization and beam management sessions.

In some aspects, such an approach may support long-lasting data offloading sessions for sub-THz links, reduced complexity of synchronization and beam management maintenance for SCells, network power consumption reduction with a more power efficient sub-THz deployment approach, and/or multi-hop links with unlimited/not restricted numbers of smart repeaters (e.g., allowing an extended range or mesh topology).

FIG. 5 is a diagram illustrating an example 500 associated with synchronization and beam management sessions for long-lasting data offloading sessions over sub-THz links, in accordance with the present disclosure. As shown in FIG. 5, example 500 includes communication between a sub-THz node (e.g., UE 120) and a network node (e.g., network node 110). In some aspects, the sub-THz node and the network node may be included in a wireless network, such as wireless network 100.

As shown by reference number 502, the network node may establish a sub-THz link with the sub-THz node. The sub-THz node may be a sub-THz UE, a sub-THz repeater, or a sub-THz AP. The network node may be associated with a PCell and an SCell. The PCell may be associated with a lower frequency band (e.g., FR1, FR2, or FR4). The PCell may be associated with a PCell link. The sub-THz link may be associated with the SCell. In some aspects, the sub-THz link may be associated with a long-lasting data offloading session. The long-lasting data offloading session may be non-sporadic and may not be associated with bursts of data transmissions. The long-lasting data offloading session may be established for a relatively long period of time, as opposed to a short-lasting data offloading session, which may be established to support a burst of traffic and then may be shut down. In some aspects, the sub-THz link between the network node and the sub-THz node may be a sub-THz multi-hop link. For example, one or more additional sub-THz nodes, such as repeaters or APs, may be between the network node and the sub-THz node.

In some aspects, regarding a synchronization and beam management session scheduling, an initial synchronization and beam management procedure carried out per sub-THz multi-hop link activation may be the same for short-lasting and long-lasting data offloading sessions. A synchronization and beam management session may be carried out per activation per hop, according to a progressive synchronization approach, and may be required to achieve a complete time synchronization and serving Tx/Rx beam refinement/determination for a sub-THz link (e.g., a frequency synchronization may be known or derived based at least in part on a PCell). A receiving node of each hop-specific synchronization and beam management session may respond with synchronization and beam management feedback, which may be provided over the PCell, and which may provide an in-sync indication (e.g., a value set to "1") when a synchronization and beam management reference signal detection procedure was successful on one of the swept or tested beams.

In some aspects, the same or slightly modified waveforms may be used for synchronization and beam management reference signals for additional synchronization and beam management sessions. Some waveform modifications, assuming that time synchronization is generally already maintained for the sub-THz link, for a synchronization and beam management maintenance procedure may be considered.

As shown by reference number 504, the network node may schedule an additional synchronization and beam management session between the network node and the sub-THz node based at least in part on a timing-based scheduling, or based at least in part on an event-based scheduling. The additional synchronization and beam management session may be scheduled based at least in part on a duration associated with the long-lasting data offloading session satisfying a threshold time period, in accordance with the timing-based scheduling. The threshold time period may be a per-hop threshold, and the threshold time period may be based at least in part on UE speed and mobility characteristics. The additional synchronization and beam management session may be scheduled based at least in part on a triggering bit signaled from the sub-THz node over a PCell link between the network node and the sub-THz node, in accordance with the event-based scheduling. The triggering bit may indicate a PCell timing drift satisfying a threshold, a PCell frequency drift satisfying a threshold, or a PCell Rx beam switch event. The additional synchronization and beam management session may be scheduled based at least in part on a PCell Tx beam switch event or a sub-THz link quality or rate degradation, in accordance with the event-based scheduling. In some aspects, when the sub-THz link between the network node and the sub-THz node is the sub-THz multi-hop link, the additional synchronization and beam management session may be scheduled by the network node per hop starting from a specific node associated with the sub-THz multi-hop link and progressing in a downlink direction.

In some aspects, for long-lasting data offloading sessions, additional synchronization and beam management sessions may be scheduled by the network node per a threshold time period duration or semi-periodically along an active session. Alternatively, for long-lasting data offloading sessions, additional synchronization and beam management sessions may be based at least in part on an event driven scheduling during an active sub-THz data offloading session. The additional synchronization and beam management sessions may be scheduled similarly to a manner in which the initial synchronization and beam management sessions are configured and scheduled per hop during a sub-THz multi-hop link activation, but may involve certain parameter adjustments between different synchronization and beam management sessions scheduled at different times. In some aspects, a synchronization and beam management report may be provided over the PCell in response to a scheduled synchronization and beam management session (e.g., every scheduled synchronization and beam management session).

In some aspects, for a quasi/semi-periodic allocation, synchronization and beam management sessions may be scheduled by the network node for a long-lasting sub-THz active link or data offloading session once per a threshold time period. The threshold time period may be different per hop, as UE-to-AP and UE-to-network-node hops may be impacted by UE movement and speed/mobility characteristics, while other infrastructure hops (e.g., repeater-to-AP or network-node-to-repeater) may be static and hence more stable by definition. More dynamic UEs may have a higher rate of synchronization and beam management session schedulings on corresponding hops. UE mobility characteristics may be known based at least in part on positioning tracking for the UE over the PCell, based at least in part on a PCell beam switching rate for the UE, or based at least in part on outer loop link adaptation (OLLA) responses and channel state feedback (CSF) variations from the UE over a PCell link.

In some aspects, the event driven scheduling may be based at least in part a list of criteria, which may be evaluated on a sub-THz node based at least in part on PCell Rx measurements, or the event driven scheduling based at least in part on a list of criteria that are measurable directly or may be known by definition by the PCell (e.g., on the PCell gNB side). Triggering criteria that are evaluated by the sub-THz node may set a triggering bit, which may be signaled to the network node over the PCell link to trigger a synchronization and beam management session scheduling.

In some aspects, in the case of event driven scheduling, a possible list of events may be defined. A first event may be associated with a PCell timing drift being greater than a threshold, which may be starting from a last scheduled synchronization and beam management session for a corresponding node. Whether the PCell timing drift is greater than the threshold may be evaluated on a PCell Rx side of the corresponding node of a multi-hop sub-THz link and indicated to the network node. A last synchronization and beam management session scheduling may be performed over the PCell, so its timing may be known on the PCell Rx side of the corresponding node and may be taken as a reference time. A second event may be associated with a PCell frequency or frequency drift being greater than a threshold, which may be starting from the last scheduled synchronization and beam management session for the corresponding node. Whether the PCell frequency or frequency drift is greater than the threshold may be evaluated on the PCell Rx side of the corresponding node of the multi-hop sub-THz link and indicated to the network node. A third event may be associated with a PCell Tx beam switch event, which may be controlled by the PCell network node and may be known on the network node side (e.g., controlled by a PCell gNB and known on a gNB side). A fourth event may be associated with a PCell Rx beam switch event, which may be indicated by a PCell UE to the network node. A fifth event may be associated with a sub-THz link quality or rate degradation, which may be known to the network node based at least in part on CSF reports and hybrid automatic repeat request (HARQ) statistics for the sub-THz link that are signaled over the PCell. For example, the sub-THz link quality or rate degradation may occur due to an increased rate of negative acknowledgements (NACKs) and/or a relative MCS drop below a threshold in CSF reports between two consecutive channel state information reference signal (CSI-RS) sessions on the sub-THz link. An additional synchronization and beam management session may be scheduled by the network node in response to a triggering event, which may be based at least in part on an occurrence of one of the five events.

As shown by reference number 506, the network node may perform synchronization and beam management during the additional synchronization and beam management session to achieve a time synchronization between the network node and the sub-THz node and to refine an SCell Tx beam and an SCell Rx beam for the sub-THz link. During the synchronization and beam management, the network node may schedule a dedicated synchronization and beam management reference signal, during which several Tx beams may be swept inside an angular sector/span around a known coarse Tx beam direction for the sub-THz link. These Tx beams may be tested with several Rx beam hypotheses around a known coarse Rx beam direction. The additional synchronization and beam management session may be needed to maintain the long-lasting data offloading session without sustaining a performance degradation.

In some aspects, the sub-THz link between the network node and the sub-THz node may be the sub-THz multi-hop link. Different hops of the sub-THz multi-hop link may be associated with different rates of synchronization and beam management session scheduling, which may be based at least in part on the different hops corresponding to infrastructure hops or the different hops being associated with varying distances.

In some aspects, a progressive synchronization approach for multi-hop links may be applicable for long-lasting data offloading sessions. However, different hops may require a different rate of synchronization and beam management session scheduling. For example, closest infrastructure hops (e.g., not a direct UE hop) to the network node in a downlink direction may have a lower rate of synchronization and beam management sessions because infrastructure links may be static and have an LOS channel over the sub-THz link and hence an LOS dominant component over the PCell. As a result, fewer dynamics in relative timing for the sub-THz SCell and the PCell and fewer sub-THz beam variations may be expected. More distant hops may be associated with longer PCell links with the network node, and may be associated with a higher potential for relative sub-THz and PCell link channels or timing variations. Direct sub-THz hops with a UE (e.g., UE-to-AP or UE-to-network-node) may require a higher rate of synchronization and beam management sessions. Different synchronization and beam management session rates on different hops may occur when synchronization sessions follow progressive synchronization signal rules. Previous hops (e.g., all of the previous hops) should be already "in-sync" while a synchronization and beam management session is scheduled for a next hop.

In some aspects, the SCell Tx beam and the SCell Rx beam for the sub-THz link may be refined based at least in part on one or more known best candidate beams per hop, as indicated in a beam management report from a previous synchronization and beam management session.

In some aspects, in relation to an SCell beam switch, a sub-THz beam change or refinement may be needed from time to time for long-lasting sub-THz activation periods or data offloading sessions. The sub-THz beam change or refinement may be typically done across a few known best candidate beams per hops, which may be known from a beam management report provided by a node as a response to a previous synchronization and beam management session. A sub-THz beam change (e.g., Tx and Rx beams) may be done as a response to an additional synchronization and beam management session since no other beam management related reference signals may be assumed to be in use for sub-THz operations.

In some aspects, the network node may receive, from the sub-THz node, an in-sync status of the sub-THz node. The in-sync status of the sub-THz node may be in relation to a time synchronization and may be valid until no change in a PCell and SCell relative channel delay or timing is produced without a further synchronization update. An in-sync status change may be associated with a PCell timing drift, a PCell frequency drift, a PCell Tx beam switch event, or a PCell Rx beam switch event.

In some aspects, a sub-THz in-sync status from a time synchronization perspective may be valid until no changes are present in a PCell or sub-THz SCell relative channel delay/timing without any further synchronization update/ session. The in-sync status change may be coupled to or related to a time/frequency movement or drift on the PCell, as a response to PCell channel delay variations. The in-sync status change may be coupled to or related to PCell or sub-THz SCell beam switching events, which may involve some respective relative channel delay changes causing sub-THz timing mismatches (e.g., a sub-THz timing may be determined relative to a PCell timing). An in-sync status flag may be used as the triggering bit when the triggering event is based at least in part on the list of criteria that are evaluated by the sub-THz node, where the list of criteria may be evaluated based at least in part on PCell Rx measurements. In some aspects, to avoid an in-sync status loss, an SCell beam switch on any involved node may be, by definition, coupled to the corresponding synchronization and beam management session scheduling on that node, where a related time adjustment for a sub-THz hop may be determined for any new selected beam during the synchronization and beam management session.

In some aspects, a PCell Tx beam switch, which may be relevant for an FR2-based PCell, may involve synchronization and beam management session schedulings for a corresponding sub-THz multi-hop link, which may start from a specific node for which its PCell link had a beam switch event and run progressively until a last node of the sub-THz multi-hop link in a downlink direction (e.g., a sub-THz UE). For a relatively short sub-THz based data offloading session, the PCell network node may not (e.g., should not) trigger a beam switch for a PCell link for those involved in the activated sub-THz link component/node. A PCell beam switch for Tx may be prohibited for a short-lasting sub-THz-based data offloading session. However, for long-lasting sub-THz data offloading sessions, this requirement may not be held because a PCell connectivity should be preserved and may require some PCell link beam switches along the activation duration. A PCell beam switch for Tx may be permitted for long-lasting sub-THz data offloading sessions. The PCell Tx beam switch may be controlled by the network node, such that the beam switching event and timing may be known by the network node. The PCell beam switch may be a type of event for event driven synchronization and beam management session schedulings for the multi-hop sub-THz link.

In some aspects, no PCell Rx beam switches may be present on PCell links related to the activated multi-hop sub-THz link, in the case of the relatively short sub-THz based data offloading session, which may be controlled on the sub-THz UE side for a reduced capability UE or on a sub-THz smart repeater side used to maintain a PCell link/connectivity on the sub-THz smart repeater side. A PCell beam switch for Rx may be prohibited for a short-lasting sub-THz-based data offloading session. Such a restriction may involve a new indication/configuration from the PCell network node to the sub-THz UE and a reduced capability UE on the sub-THz smart repeater side in order to suspend PCell link Rx beam switching for a relatively short time duration. Alternatively, such a restriction may be a defined behavior for any activated sub-THz link component, such that the PCell link Rx beam switching may be suspended for some short minimum time duration after a last synchronization and beam management session for the activated sub-THz link or hop or node.

In some aspects, in case of a relatively long-lasting sub-THz link activation time, Rx beam switching on related PCell links may not be avoided. As a result, Rx beam switching on the related PCell links may be one of the events that will trigger additional synchronization and beam management session schedulings for the multi-hop sub-THz link (similar to the case of PCell link Tx beam switching). A PCell beam switch for Rx may be permitted for long-lasting sub-THz data offloading sessions. However, Rx beam management may be typically done autonomously on the UE side, and the network node may be unaware of any Rx beam switching on the UE side. To support the sub-THz deployment with long-lasting sub-THz SCell link activation times, an option may be defined for PCell links to provide a synchronized Rx beam switch indication to the PCell network node ahead of time, such that a required sub-THz link maintenance (e.g., synchronization and beam management session scheduling) may be scheduled after the Rx beam switching event on the PCell link side.

As indicated above, FIG. 5 is provided as an example. Other examples may differ from what is described with regard to FIG. 5.

Figure 6:
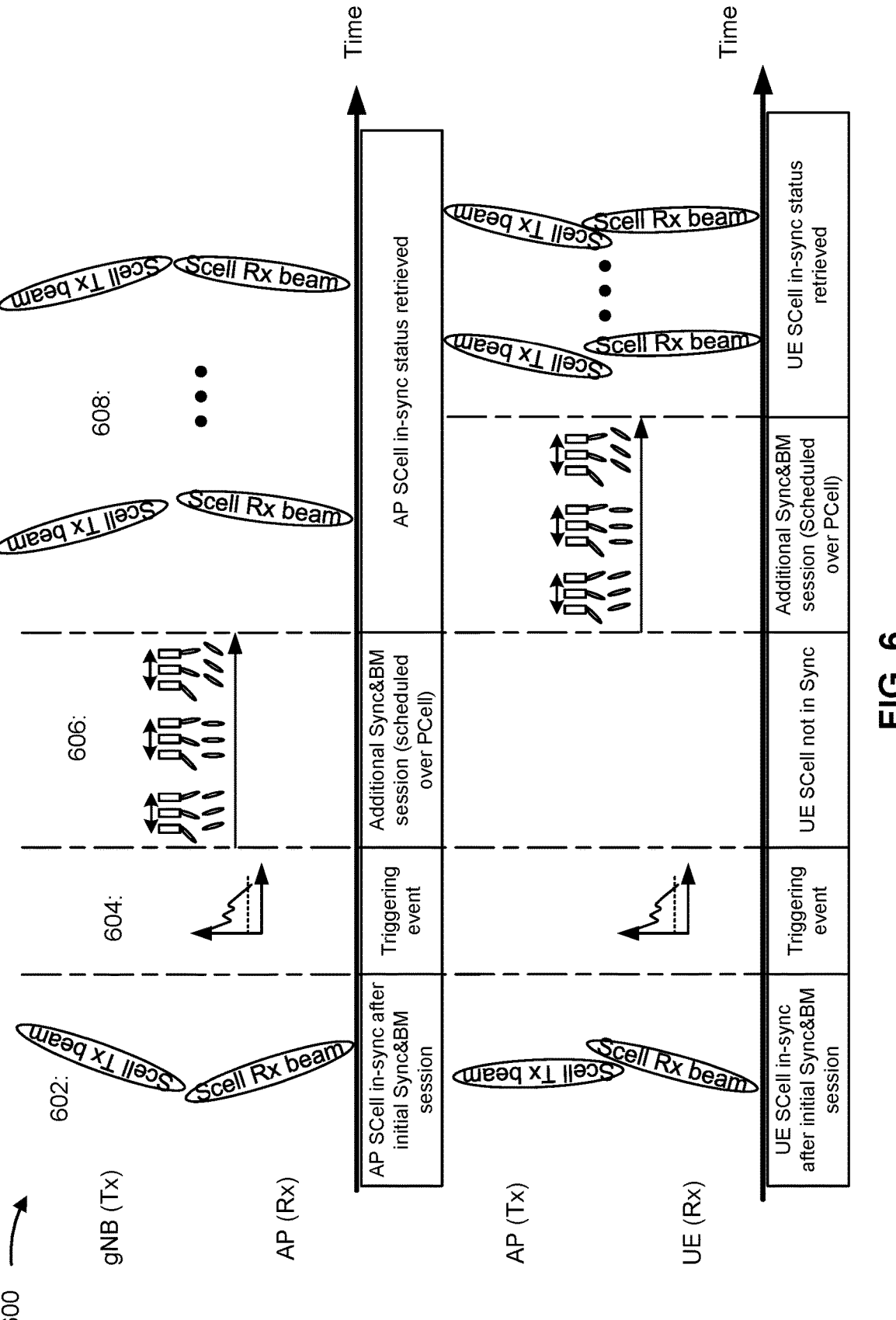

FIG. 6 is a diagram illustrating an example 600 associated with synchronization and beam management sessions for long-lasting data offloading sessions over sub-THz links, in accordance with the present disclosure.

As shown in FIG. 6, in an event driven scheduling of a progressive synchronization and beam management (Sync&BM) update session, a two-hop sub-THz link may be between a sub-THz network node (co-located with a PCell network node) and a UE via a corresponding sub-THz AP. As shown by reference number 602, all sub-THz link components may initially be in-sync after an initial synchronization and beam management session across the hops (e.g., a progressive synchronization). For example, an AP SCell may be in-sync after the initial synchronization and beam management session, and a UE SCell may be in-sync after the initial synchronization and beam management session. As shown by reference number 604, at some point later in time, a triggering event may occur, which may require a scheduling of an additional synchronization and beam management session over the corresponding hop, over the number of hops, or over an entire link in accordance with an event driven scheduling approach. As an example, the triggering event may be associated with a sub-THz link quality degradation, and may require a resynchronization of all link components. Other types of events, such as a beam switch on a specific node or a time drift on a specific node, may require a synchronization update only starting from the specific node and until a sub-THz UE in a downlink direction.

As shown by reference number 606, a synchronization and beam management update may be performed based at least in part on a progressive synchronization approach, where a first hop in a downlink may be synced first followed by a synchronization session on a second hop. For example, an additional synchronization and beam management session may be scheduled over the PCell for the first hop, during which time a UE SCell may not be in-sync, and an additional synchronization and beam management session may be scheduled over the PCell for the second hop. As shown by reference number 608, after the additional synchronization and beam management session for the first hop, an AP SCell in-sync status may be retrieved. After the additional synchronization and beam management session for the second hop, a UE SCell in-sync status may be retrieved. In other words, following the synchronization and beam management update process, the SCell Tx and Rx beams on both link hops/components may be updated.

As indicated above, FIG. 6 is provided as an example. Other examples may differ from what is described with regard to FIG. 6.

FIG. 7 is a diagram illustrating an example process 700 performed, for example, by a network node, in accordance with the present disclosure. Example process 700 is an example where the network node (e.g., network node 110) performs operations associated with synchronization and beam management sessions for long-lasting data offloading sessions over sub-THz links.

As shown in FIG. 7, in some aspects, process 700 may include establishing a sub-THz link with a sub-THz node, wherein the sub-THz link is associated with an SCell of the network node, the sub-THz link is associated with a long-lasting data offloading session, and the network node is associated with a PCell (block 710). For example, the network node (e.g., using communication manager 1006, depicted in FIG. 10) may establish a sub-THz link with a sub-THz node, wherein the sub-THz link is associated with an SCell of the network node, the sub-THz link is associated with a long-lasting data offloading session, and the network node is associated with a PCell, as described above.

As further shown in FIG. 7, in some aspects, process 700 may include scheduling an additional synchronization and beam management session between the network node and the sub-THz node based at least in part on a timing-based scheduling, or based at least in part on an event-based scheduling (block 720). For example, the network node (e.g., using communication manager 1006, depicted in FIG. 10) may schedule an additional synchronization and beam management session between the network node and the sub-THz node based at least in part on a timing-based scheduling, or based at least in part on an event-based scheduling, as described above.

As further shown in FIG. 7, in some aspects, process 700 may include performing synchronization and beam management during the additional synchronization and beam management session to achieve a time synchronization between the network node and the sub-THz node and to refine an SCell Tx beam and an SCell Rx beam for the sub-THz link (block 730). For example, the network node (e.g., using communication manager 1006, depicted in FIG. 10) may perform synchronization and beam management during the additional synchronization and beam management session to achieve a time synchronization between the network node and the sub-THz node and to refine an SCell Tx beam and an SCell Rx beam for the sub-THz link, as described above.

Process 700 may include additional aspects, such as any single aspect or any combination of aspects described below and/or in connection with one or more other processes described elsewhere herein.

In a first aspect, the sub-THz node is a sub-THz UE, a sub-THz repeater, or a sub-THz AP.

In a second aspect, alone or in combination with the first aspect, the sub-THz link between the network node and the sub-THz node is a sub-THz multi-hop link, and the additional synchronization and beam management session is scheduled by the network node per hop starting from a specific node associated with the sub-THz multi-hop link and progressing in a downlink direction.

In a third aspect, alone or in combination with one or more of the first and second aspects, the additional synchronization and beam management session is scheduled based at least in part on a duration associated with the long-lasting data offloading session satisfying a threshold time period, in accordance with the timing-based scheduling.

In a fourth aspect, alone or in combination with one or more of the first through third aspects, the threshold time period is a per-hop threshold, and the threshold time period is based at least in part on UE speed and mobility characteristics.

In a fifth aspect, alone or in combination with one or more of the first through fourth aspects, the additional synchronization and beam management session is scheduled based at least in part on a triggering bit signaled from the sub-THz node over a PCell link between the network node and the sub-THz node, in accordance with the event-based scheduling.

In a sixth aspect, alone or in combination with one or more of the first through fifth aspects, the triggering bit indicates one of a PCell timing drift satisfying a threshold, a PCell frequency drift satisfying a threshold, or a PCell Rx beam switch event.

In a seventh aspect, alone or in combination with one or more of the first through sixth aspects, the additional synchronization and beam management session is scheduled based at least in part on a PCell Tx beam switch event or a sub-THz link quality or rate degradation, in accordance with the event-based scheduling.

In an eighth aspect, alone or in combination with one or more of the first through seventh aspects, the sub-THz link between the network node and the sub-THz node is a sub-THz multi-hop link, wherein different hops of the sub-THz multi-hop link are associated with different rates of synchronization and beam management session scheduling based at least in part on the different hops corresponding to infrastructure hops or the different hops being associated with varying distances.

In a ninth aspect, alone or in combination with one or more of the first through eighth aspects, the SCell Tx beam and the SCell Rx beam for the sub-THz link are refined based at least in part on one or more known best candidate beams per hop, as indicated in a beam management report from a previous synchronization and beam management session.

In a tenth aspect, alone or in combination with one or more of the first through ninth aspects, process 700 includes receiving, from the sub-THz node, an in-sync status of the sub-THz node, wherein the in-sync status of the sub-THz node in relation to a time synchronization is valid until no change in a PCell and SCell relative channel delay or timing is produced without a further synchronization update, wherein an in-sync status change is associated with one of a PCell timing drift, a PCell frequency drift, a PCell Tx beam switch event, or a PCell Rx beam switch event.

In an eleventh aspect, alone or in combination with one or more of the first through tenth aspects, a PCell beam switch for Tx or Rx is prohibited for a short-lasting sub-THz-based data offloading session, and the PCell beam switch for Tx or Rx is permitted for the long-lasting data offloading session.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a sub-THz node, in accordance with the present disclosure. Example process 800 is an example where the sub-THz node (e.g., UE 120) performs operations associated with synchronization and beam management sessions for long-lasting data offloading sessions over sub-THz links.

As shown in FIG. 8, in some aspects, process 800 may include establishing a sub-THz link with a network node, wherein the sub-THz link is associated with an SCell of the network node, and the sub-THz link is associated with a long-lasting data offloading session (block 810). For example, the sub-THz node (e.g., using communication manager 1006, depicted in FIG. 10) may establish a sub-THz link with a network node, wherein the sub-THz link is associated with an SCell of the network node, and the sub-THz link is associated with a long-lasting data offloading session, as described above.

As further shown in FIG. 8, in some aspects, process 800 may include performing, based at least in part on a timing-based scheduling or an event-based scheduling, synchronization and beam management during an additional synchronization and beam management session to achieve a time synchronization between the sub-THz node and the network node and to refine an SCell Tx beam and an SCell Rx beam for the sub-THz link (block 820). For example, the sub-THz node (e.g., using communication manager 1006, depicted in FIG. 10) may perform, based at least in part on a timing-based scheduling or an event-based scheduling, synchronization and beam management during an additional synchronization and beam management session to achieve a time synchronization between the sub-THz node and the network node and to refine an SCell Tx beam and an SCell Rx beam for the sub-THz link, as described above.

Process 800 may include additional aspects, such as any single aspect or any combination of aspects described below and/or in connection with one or more other processes described elsewhere herein.

In a first aspect, the sub-THz node is a sub-THz UE, a sub-THz repeater, or a sub-THz AP.

In a second aspect, alone or in combination with the first aspect, the sub-THz link between the sub-THz node and the network node is a sub-THz multi-hop link, and the additional synchronization and beam management session is scheduled per hop starting from a specific node associated with the sub-THz multi-hop link and progressing in a downlink direction.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
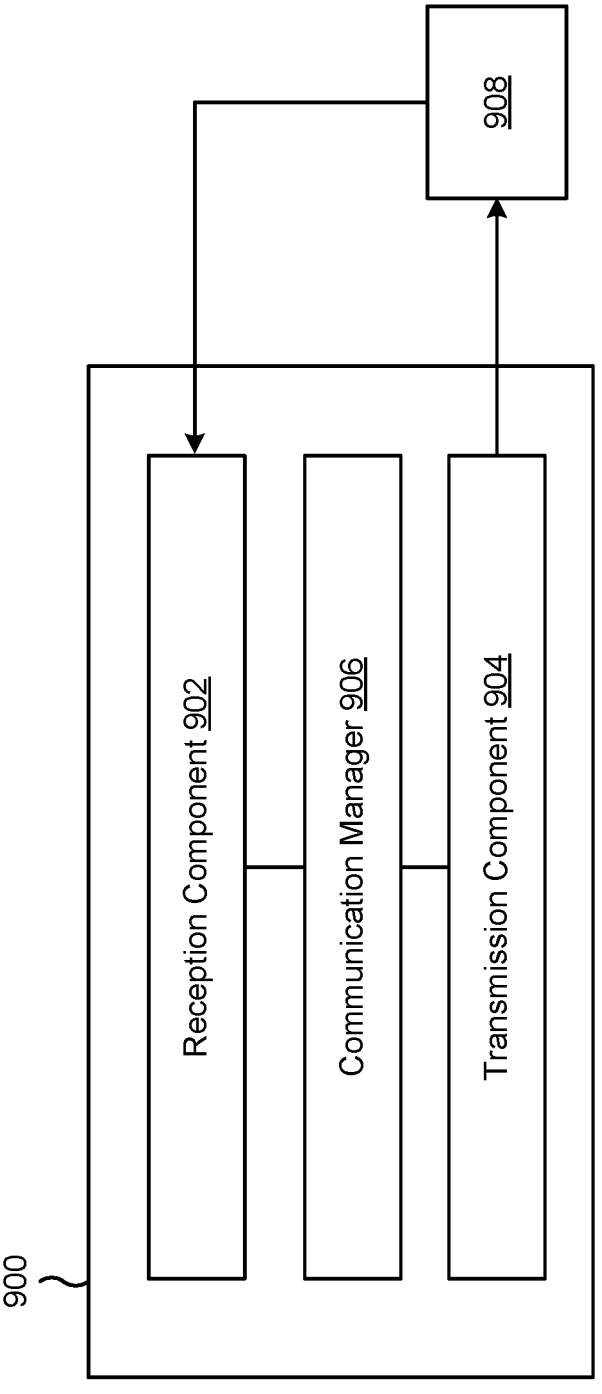
FIGS. 9-10 are diagrams of example apparatuses for wireless communication, in accordance with the present disclosure.

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 150 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 5-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2. In some aspects, the reception component 902 and/or the transmission component 904 may include or may be included in a network interface. The network interface may be configured to obtain and/or output signals for the apparatus 900 via one or more communications links, such as a backhaul link, a midhaul link, and/or a fronthaul link.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The communication manager 906 may establish a sub-THz link with a sub-THz node, wherein the sub-THz link is associated with an SCell of the network node, the sub-THz link is associated with a long-lasting data offloading session, and the network node is associated with a PCell. The communication manager 906 may schedule an additional synchronization and beam management session between the network node and the sub-THz node based at least in part on a timing-based scheduling, or based at least in part on an event-based scheduling. The communication manager 906 may perform synchronization and beam management during the additional synchronization and beam management session to achieve a time synchronization between the network node and the sub-THz node and to refine an SCell Tx beam and an SCell Rx beam for the sub-THz link.

The reception component 902 may receive, from the sub-THz node, an in-sync status of the sub-THz node, wherein the in-sync status of the sub-THz node in relation to a time synchronization is valid until no change in a PCell and SCell relative channel delay or timing is produced without a further synchronization update, and an in-sync status change is associated with one of: a PCell timing drift, a PCell frequency drift, a PCell Tx beam switch event, or a PCell Rx beam switch event.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
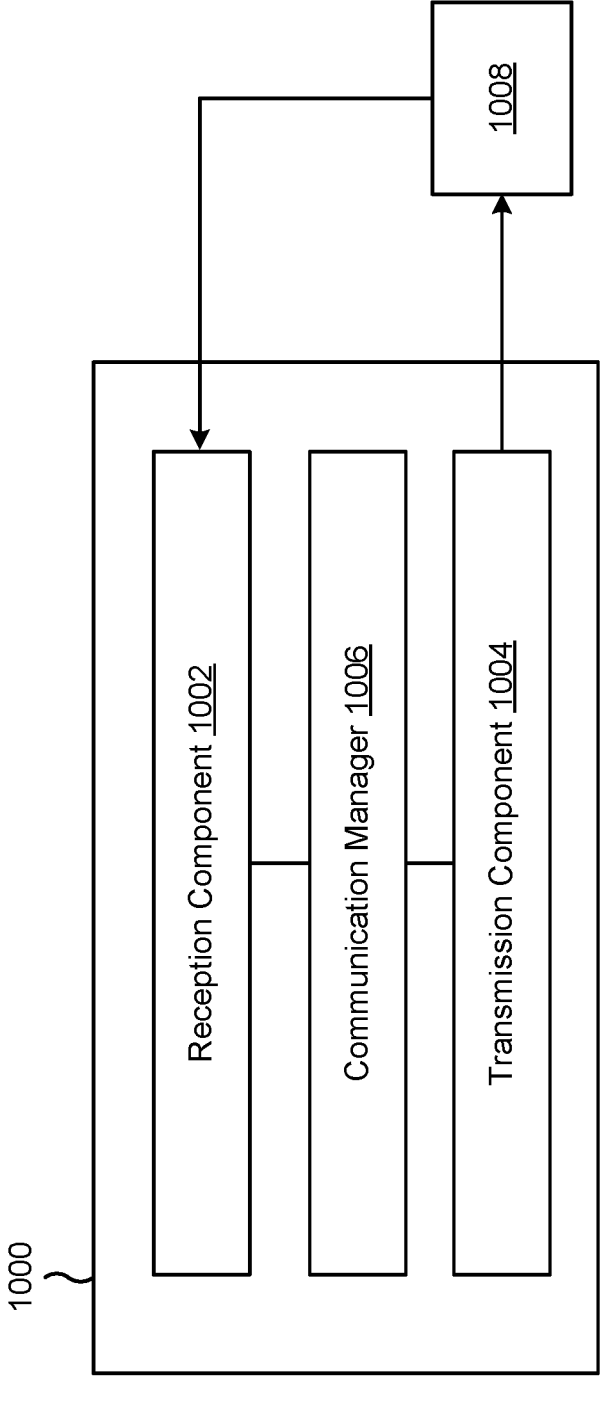

FIG. 10 is a diagram of an example apparatus 1000 for wireless communication, in accordance with the present disclosure. The apparatus 1000 may be a sub-THz node, or a sub-THz node may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 5-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the sub-THz node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the sub-THz node described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the sub-THz node described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The communication manager 1006 may establish a sub-THz link with a network node, wherein the sub-THz link is associated with an SCell of the network node, and the sub-THz link is associated with a long-lasting data offloading session. The communication manager 1006 may perform, based at least in part on a timing-based scheduling or an event-based scheduling, synchronization and beam management during an additional synchronization and beam management session to achieve a time synchronization between the sub-THz node and the network node and to refine an SCell Tx beam and an SCell Rx beam for the sub-THz link.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a network node, comprising: establishing, by the network node, a sub-terahertz (sub-THz) link with a sub-THz node, wherein the sub-THz link is associated with a secondary cell (SCell) of the network node, the sub-THz link is associated with a long-lasting data offloading session, and the network node is associated with a primary cell (PCell); scheduling, by the network node, an additional synchronization and beam management session between the network node and the sub-THz node based at least in part on a timing-based scheduling, or based at least in part on an event-based scheduling; and performing, by the network node, synchronization and beam management during the additional synchronization and beam management session to achieve a time synchronization between the network node and the sub-THz node and to refine an SCell transmit (Tx) beam and an SCell receive (Rx) beam for the sub-THz link.

Aspect 2: The method of Aspect 1, wherein the sub-THz node is a sub-THz user equipment (UE), a sub-THz repeater, or a sub-THz access point (AP).

Aspect 3: The method of any of Aspects 1-2, wherein the sub-THz link between the network node and the sub-THz node is a sub-THz multi-hop link, and wherein the additional synchronization and beam management session is scheduled by the network node per hop starting from a specific node associated with the sub-THz multi-hop link and progressing in a downlink direction.

Aspect 4: The method of any of Aspects 1-3, wherein the additional synchronization and beam management session is scheduled based at least in part on a duration associated with the long-lasting data offloading session satisfying a threshold time period, in accordance with the timing-based scheduling.

Aspect 5: The method of Aspect 4, wherein the threshold time period is a per-hop threshold, and wherein the threshold time period is based at least in part on UE speed and mobility characteristics.

Aspect 6: The method of any of Aspects 1-5, wherein the additional synchronization and beam management session is scheduled based at least in part on a triggering bit signaled from the sub-THz node over a PCell link between the network node and the sub-THz node, in accordance with the event-based scheduling.

Aspect 7: The method of Aspect 6, wherein the triggering bit indicates one of: a PCell timing drift satisfying a threshold, a PCell frequency drift satisfying a threshold, or a PCell Rx beam switch event.

Aspect 8: The method of any of Aspects 1-7, wherein the additional synchronization and beam management session is scheduled based at least in part on a PCell Tx beam switch event or a sub-THz link quality or rate degradation, in accordance with the event-based scheduling.

Aspect 9: The method of any of Aspects 1-8, wherein the sub-THz link between the network node and the sub-THz node is a sub-THz multi-hop link, wherein different hops of the sub-THz multi-hop link are associated with different rates of synchronization and beam management session scheduling based at least in part on the different hops corresponding to infrastructure hops or the different hops being associated with varying distances.

Aspect 10: The method of any of Aspects 1-9, wherein the SCell Tx beam and the SCell Rx beam for the sub-THz link are refined based at least in part on one or more known best candidate beams per hop, as indicated in a beam management report from a previous synchronization and beam management session.

Aspect 11: The method of any of Aspects 1-10, further comprising: receiving, from the sub-THz node, an in-sync status of the sub-THz node, wherein the in-sync status of the sub-THz node in relation to a time synchronization is valid until no change in a PCell and SCell relative channel delay or timing is produced without a further synchronization update, wherein an in-sync status change is associated with one of: a PCell timing drift, a PCell frequency drift, a PCell Tx beam switch event, or a PCell Rx beam switch event.

Aspect 12: The method of any of Aspects 1-11, wherein a PCell beam switch for Tx or Rx is prohibited for a short-lasting sub-THz-based data offloading session, and wherein the PCell beam switch for Tx or Rx is permitted for the long-lasting data offloading session.

Aspect 13: A method of wireless communication performed by a sub-terahertz (sub-THz) node, comprising: establishing, by the sub-THz node, a sub-THz link with a network node, wherein the sub-THz link is associated with a secondary cell (SCell) of the network node, and the sub-THz link is associated with a long-lasting data offloading session; and performing, based at least in part on a timing-based scheduling or an event-based scheduling, synchronization and beam management during an additional synchronization and beam management session to achieve a time synchronization between the sub-THz node and the network node and to refine an SCell transmit (Tx) beam and an SCell receive (Rx) beam for the sub-THz link.

Aspect 14: The method of Aspect 13, wherein the sub-THz node is a sub-THz user equipment (UE), a sub-THz repeater, or a sub-THz access point (AP).

Aspect 15: The method of any of Aspects 13-14, wherein the sub-THz link between the sub-THz node and the network node is a sub-THz multi-hop link, and wherein the additional synchronization and beam management session is scheduled per hop starting from a specific node associated with the sub-THz multi-hop link and progressing in a downlink direction.

Aspect 16: An apparatus for wireless communication at a device, comprising a processor; memory coupled with the processor; and instructions stored in the memory and executable by the processor to cause the apparatus to perform the method of one or more of Aspects 1-12.

Aspect 17: A device for wireless communication, comprising a memory and one or more processors coupled to the memory, the one or more processors configured to perform the method of one or more of Aspects 1-12.

Aspect 18: An apparatus for wireless communication, comprising at least one means for performing the method of one or more of Aspects 1-12.

Aspect 19: A non-transitory computer-readable medium storing code for wireless communication, the code comprising instructions executable by a processor to perform the method of one or more of Aspects 1-12.

Aspect 20: A non-transitory computer-readable medium storing a set of instructions for wireless communication, the set of instructions comprising one or more instructions that, when executed by one or more processors of a device, cause the device to perform the method of one or more of Aspects 1-12.

Aspect 21: An apparatus for wireless communication at a device, comprising a processor; memory coupled with the processor; and instructions stored in the memory and executable by the processor to cause the apparatus to perform the method of one or more of Aspects 13-15.

Aspect 22: A device for wireless communication, comprising a memory and one or more processors coupled to the memory, the one or more processors configured to perform the method of one or more of Aspects 13-15.

Aspect 23: An apparatus for wireless communication, comprising at least one means for performing the method of one or more of Aspects 13-15.

Aspect 24: A non-transitory computer-readable medium storing code for wireless communication, the code comprising instructions executable by a processor to perform the method of one or more of Aspects 13-15.

Aspect 25: A non-transitory computer-readable medium storing a set of instructions for wireless communication, the set of instructions comprising one or more instructions that, when executed by one or more processors of a device, cause the device to perform the method of one or more of Aspects 13-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a network node, comprising:
    one or more memories; and
    one or more processors, coupled to the one or more memories, that, based at least in part on information stored in the one or more memories, are configured to:
        establish a sub-terahertz (sub-THz) link with a sub-THz node,
            wherein the sub-THz link is associated with a secondary cell (SCell) of the network node, the sub-THz link is associated with a long-lasting data offloading session, and the network node is associated with a primary cell (PCell), and
            wherein the long-lasting data offloading session is non-sporadic;
        schedule an additional synchronization and beam management session between the network node and the sub-THz node based at least in part on a timing-based scheduling, or based at least in part on an event-based scheduling,
            wherein the one or more processors, to schedule the additional synchronization and beam management session, are configured to schedule the additional synchronization and beam management session based at least in part on a duration associated with the long-lasting data offloading session satisfying a threshold time period, in accordance with the timing-based scheduling; and
        perform synchronization and beam management during the additional synchronization and beam management session to achieve a time synchronization between the network node and the sub-THz node and to refine an SCell transmit (Tx) beam and an SCell receive (Rx) beam for the sub-THz link.

2. The apparatus of claim 1, wherein the sub-THz node is a sub-THz user equipment (UE), a sub-THz repeater, or a sub-THz access point (AP).

3. The apparatus of claim 1, wherein the sub-THz link between the network node and the sub-THz node is a sub-THz multi-hop link, and
    wherein the one or more processors, to schedule the additional synchronization and beam management session, are configured to schedule the additional synchronization and beam management session per hop starting from a specific node associated with the sub-THz multi-hop link and progressing in a downlink direction.

4. The apparatus of claim 1, wherein the threshold time period is a per-hop threshold, and wherein the threshold time period is based at least in part on UE speed and mobility characteristics.

5. The apparatus of claim 1, wherein the one or more processors, to schedule the additional synchronization and beam management session, are configured to schedule the additional synchronization and beam management session based at least in part on a triggering bit signaled from the sub-THz node over a PCell link between the network node and the sub-THz node, in accordance with the event-based scheduling.

6. The apparatus of claim 5, wherein the triggering bit indicates one of: a PCell timing drift satisfying a threshold, a PCell frequency drift satisfying a threshold, or a PCell Rx beam switch event.

7. The apparatus of claim 1, wherein the one or more processors, to schedule the additional synchronization and beam management session, are configured to schedule the additional synchronization and beam management session based at least in part on a PCell Tx beam switch event or a sub-THz link quality or rate degradation, in accordance with the event-based scheduling.

8. The apparatus of claim 1, wherein the sub-THz link between the network node and the sub-THz node is a sub-THz multi-hop link, wherein different hops of the sub-THz multi-hop link are associated with different rates of synchronization and beam management session scheduling based at least in part on the different hops corresponding to infrastructure hops or the different hops being associated with varying distances.

9. The apparatus of claim 1, wherein the SCell Tx beam and the SCell Rx beam for the sub-THz link are refined based at least in part on one or more known best candidate beams per hop, as indicated in a beam management report from a previous synchronization and beam management session.

10. The apparatus of claim 1, wherein the one or more processors are further configured to:
    receive, from the sub-THz node, an in-sync status of the sub-THz node, wherein the in-sync status of the sub-THz node in relation to a time synchronization is valid until no change in a PCell and SCell relative channel delay or timing is produced without a further synchronization update, wherein an in-sync status change is associated with one of: a PCell timing drift, a PCell frequency drift, a PCell Tx beam switch event, or a PCell Rx beam switch event.

11. The apparatus of claim 1, wherein a PCell beam switch for Tx or Rx is prohibited for a short-lasting sub-THz-based data offloading session, and wherein the PCell beam switch for Tx or Rx is permitted for the long-lasting data offloading session.

12. An apparatus for wireless communication at a sub-terahertz (sub-THz) node, comprising:

one or more memories; and one or more processors, coupled to the one or more memories, that, based at least in part on information stored in the one or more memories, are configured to:

establish a sub-THz link with a network node, wherein the sub-THz link is associated with a secondary cell (SCell) of the network node, and the sub-THz link is associated with a long-lasting data offloading session, and wherein the long-lasting data offloading session is non-sporadic; and perform, based at least in part on a timing-based scheduling or an event-based scheduling, synchronization and beam management during an additional synchronization and beam management session to achieve a time synchronization between the sub-THz node and the network node and to refine an SCell transmit (Tx) beam and an SCell receive (Rx) beam for the sub-THz link, wherein the additional synchronization and beam management session is scheduled based at least in part on a duration associated with the long-lasting data offloading session satisfying a threshold time period, in accordance with the timing-based scheduling.

13. The apparatus of claim 12, wherein the sub-THz node is a sub-THz user equipment (UE), a sub-THz repeater, or a sub-THz access point (AP).

14. The apparatus of claim 12, wherein the sub-THz link between the sub-THz node and the network node is a sub-THz multi-hop link, and wherein the additional synchronization and beam management session is scheduled per hop starting from a specific node associated with the sub-THz multi-hop link and progressing in a downlink direction.

15. A method of wireless communication performed by a network node, comprising:

establishing, by the network node, a sub-terahertz (sub-THz) link with a sub-THz node, wherein the sub-THz link is associated with a secondary cell (SCell) of the network node, the sub-THz link is associated with a long-lasting data offloading session, and the network node is associated with a primary cell (PCell), and wherein the long-lasting data offloading session is non-sporadic;

scheduling, by the network node, an additional synchronization and beam management session between the network node and the sub-THz node based at least in part on a timing-based scheduling, or based at least in part on an event-based scheduling, wherein the additional synchronization and beam management session is scheduled based at least in part on a duration associated with the long-lasting data offloading session satisfying a threshold time period, in accordance with the timing-based scheduling; and performing, by the network node, synchronization and beam management during the additional synchronization and beam management session to achieve a time synchronization between the network node and the sub-THz node and to refine an SCell transmit (Tx) beam and an SCell receive (Rx) beam for the sub-THz link.

16. The method of claim 15, wherein the sub-THz node is a sub-THz user equipment (UE), a sub-THz repeater, or a sub-THz access point (AP).

17. The method of claim 15, wherein the sub-THz link between the network node and the sub-THz node is a sub-THz multi-hop link, and wherein the additional synchronization and beam management session is scheduled by the network node per hop starting from a specific node associated with the sub-THz multi-hop link and progressing in a downlink direction.

18. The method of claim 15, wherein the threshold time period is a per-hop threshold, and wherein the threshold time period is based at least in part on UE speed and mobility characteristics.

19. The method of claim 15, wherein the additional synchronization and beam management session is scheduled based at least in part on a triggering bit signaled from the sub-THz node over a PCell link between the network node and the sub-THz node, in accordance with the event-based scheduling.

20. The method of claim 19, wherein the triggering bit indicates one of: a PCell timing drift satisfying a threshold, a PCell frequency drift satisfying a threshold, or a PCell Rx beam switch event.

21. The method of claim 15, wherein the additional synchronization and beam management session is scheduled based at least in part on a PCell Tx beam switch event or a sub-THz link quality or rate degradation, in accordance with the event-based scheduling.

22. The method of claim 15, wherein the sub-THz link between the network node and the sub-THz node is a sub-THz multi-hop link, wherein different hops of the sub-THz multi-hop link are associated with different rates of synchronization and beam management session scheduling based at least in part on the different hops corresponding to infrastructure hops or the different hops being associated with varying distances.

23. The method of claim 15, wherein the SCell Tx beam and the SCell Rx beam for the sub-THz link are refined based at least in part on one or more known best candidate beams per hop, as indicated in a beam management report from a previous synchronization and beam management session.

24. The method of claim 15, further comprising:

receiving, from the sub-THz node, an in-sync status of the sub-THz node, wherein the in-sync status of the sub-THz node in relation to a time synchronization is valid until no change in a PCell and SCell relative channel delay or timing is produced without a further synchronization update, wherein an in-sync status change is associated with one of: a PCell timing drift, a PCell frequency drift, a PCell Tx beam switch event, or a PCell Rx beam switch event.

25. The method of claim 15, wherein a PCell beam switch for Tx or Rx is prohibited for a short-lasting sub-THz-based data offloading session, and wherein the PCell beam switch for Tx or Rx is permitted for the long-lasting data offloading session.

26. A method of wireless communication performed by a sub-terahertz (sub-THz) node, comprising:

establishing, by the sub-THz node, a sub-THz link with a network node, wherein the sub-THz link is associated with a secondary cell (SCell) of the network node, and the sub-THz link is associated with a long-lasting data offloading session, and wherein the long-lasting data offloading session is non-sporadic; and performing, based at least in part on a timing-based scheduling or an event-based scheduling, synchronization and beam management during an additional synchronization and beam management session to achieve a time synchronization between the sub-THz node and the network node and to refine an SCell transmit (Tx) beam and an SCell receive (Rx) beam for the sub-THz link, wherein the additional synchronization and beam management session is scheduled based at least in part on a duration associated with the long-lasting data offloading session satisfying a threshold time period, in accordance with the timing-based scheduling.

27. The method of claim 26, wherein the sub-THz node is a sub-THz user equipment (UE), a sub-THz repeater, or a sub-THz access point (AP).

28. The method of claim 26, wherein the sub-THz link between the sub-THz node and the network node is a sub-THz multi-hop link, and wherein the additional synchronization and beam management session is scheduled per hop starting from a specific node associated with the sub-THz multi-hop link and progressing in a downlink direction.

29. The apparatus of claim 1, wherein the threshold time period is different per hop.

30. The method of claim 15, wherein the threshold time period is different per hop.

* * * * *